United States Patent
Hori et al.

(10) Patent No.: US 10,560,878 B2
(45) Date of Patent: Feb. 11, 2020

(54) COMMUNICATION SYSTEM, TERMINAL, AND COMMUNICATION CONTROL METHOD

(71) Applicant: Panasonic Intellectual Property Corporation of America, Torrance, CA (US)

(72) Inventors: Takako Hori, Kanagawa (JP); Prateek Basu Mallick, Hessen (DE); Joachim Loehr, Hessen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/020,912

(22) Filed: Jun. 27, 2018

(65) Prior Publication Data

US 2018/0317144 A1 Nov. 1, 2018

Related U.S. Application Data

(63) Continuation of application No. PCT/JP2016/086557, filed on Dec. 8, 2016.

(30) Foreign Application Priority Data

Jan. 21, 2016 (JP) .................. 2016-009888

(51) Int. Cl.
*H04W 36/02* (2009.01)
*H04W 88/04* (2009.01)
(Continued)

(52) U.S. Cl.
CPC ....... *H04W 36/023* (2013.01); *H04L 61/2007* (2013.01); *H04L 65/1006* (2013.01);
(Continued)

(58) Field of Classification Search
CPC ... H04W 36/023; H04W 76/14; H04W 88/04; H04W 36/03; H04W 36/08; H04W 4/10;
(Continued)

(56) References Cited

U.S. PATENT DOCUMENTS

2008/0220728 A1* 9/2008 Seo .................. H04W 4/10
455/90.2
2009/0270105 A1 10/2009 Kakumaru
(Continued)

FOREIGN PATENT DOCUMENTS

| JP | 2008-098880 A | 4/2008 |
|---|---|---|
| JP | 2012-527151 A | 11/2012 |
| JP | 2015-213379 A | 11/2015 |

OTHER PUBLICATIONS

International Search Report of PCT application No. PCT/JP2016/086557 dated Jan. 31, 2017.
(Continued)

*Primary Examiner* — Thai Nguyen
(74) *Attorney, Agent, or Firm* — Seed IP Law Group LLP

(57) ABSTRACT

A communication system includes, of multiple terminals, a UE with a floor granted that transmits data to an MCPTT server, and a terminal other than the UE that receives the data from the MCPTT server. The UE uses either of a first service performing communication with the MCPTT server in radio connection with a base station, or a second service performing communication with the MCPTT server in radio connection with a relay terminal. The UE, when switching a radio connection destination from the base station to the relay terminal during use of the first service or when switching the radio connection destination from the relay terminal to the base station during use of the second service, buffers the data generated during the switching of the radio connection destination, and after completion of the switching of the radio connection destination, transmits the buffered data to the MCPTT server.

12 Claims, 9 Drawing Sheets

(51) Int. Cl.
| | |
|---|---|
| H04L 29/06 | (2006.01) |
| H04L 29/12 | (2006.01) |
| H04W 4/10 | (2009.01) |
| H04W 36/00 | (2009.01) |
| H04W 36/08 | (2009.01) |

(52) U.S. Cl.
CPC ...... H04L 65/1069 (2013.01); H04L 65/1073 (2013.01); H04W 88/04 (2013.01); *H04W 4/10* (2013.01); *H04W 36/03* (2018.08); *H04W 36/08* (2013.01)

(58) Field of Classification Search
CPC ............. H04L 61/2007; H04L 65/1006; H04L 65/1073; H04L 65/1069
See application file for complete search history.

(56) References Cited

U.S. PATENT DOCUMENTS

| | | | |
|---|---|---|---|
| 2010/0290430 A1 | 11/2010 | Lee et al. | |
| 2016/0135098 A1 | 5/2016 | Ahluwalia | |
| 2016/0150455 A1* | 5/2016 | Suryavanshi | H04W 36/245 455/436 |
| 2018/0124674 A1* | 5/2018 | Vutukuri | H04W 36/30 |

OTHER PUBLICATIONS

3GPP TS 22.179 V13.3.0, "3rd Generation Partnership Project; Technical Specification Group Services and System Aspects; Mission Critical Push to Talk (MCPTT) over LTE; Stage 1 (Release 13)", Dec. 2015.
3GPP TS 22.468 V13.0.0, "3rd Generation Partnership Project; Technical Specification Group Services and System Aspects; Group Communication System Enablers for LTE (GCSE_LTE) (Release 13)", Dec. 2014.
3GPP TS 23.468 V13.3.0, "3rd Generation Partnership Project; Technical Specification Group Services and System Aspects; Group Communication System Enablers for LTE (GCSE_LTE); Stage2 (Release 13)", Dec. 2015.
3GPP TS 22.278 V13.2.0, "3rd Generation Partnership Project; Technical Specification Group Services and System Aspects; Service requirements for the Evolved Packet System (EPS) (Release 13)", Dec. 2014.
3GPP TR 23.713 V13.0.0, "3rd Generation Partnership Project; Technical Specification Group Services and System Aspects; Study on extended architecture support for proximity-based services (Release 13)", Sep. 2015.
3GPP TS 23.303 V13.2.0, "3rd Generation Partnership Project; Technical Specification Group Services and System Aspects; Proximity-based services (ProSe); Stage2 (Release 13)", Dec. 2015.
3GPP TS 36.321 V12.6.0, "3rd Generation Partnership Project; Technical Specification Group Radio Access Network; Evolved Universal Terrestrial Radio Access (E-UTRA); Medium Access Control (MAC) protocol specification (Release 12)", Jun. 2015.
3GPP TR 23.779 V13.0.0, "3rd Generation Partnership Project; Technical Specification Group Services and System Aspects; Study on application architecture to support Mission Critical Push to Talk over LTE (MCPTT) services (Release 13)", Sep. 2015.
3GPP TS 23.179 V13.0.0, "3rd Generation Partnership Project; Technical Specification Group Services and System Aspects; Functional architecture and information flows to support mission critical communication services; Stage 2 (Release 13)", Dec. 2015.
3GPP TS 23.401 V13.5.0, "3rd Generation Partnership Project; Technical Specification Group Services and System Aspects; General Packet Radio Service (GPRS) enhancements for Evolved Universal Terrestrial Radio Access Network (E-UTRAN) access (Release 13)", Dec. 2015.
3GPP TS 36.300 V13.2.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", Dec. 2015.
3GPP TS 23.246 V13.3.0, "3rd Generation Partnership Project; Technical Specification Group Services and System Aspects; Multimedia Broadcast/Multicast Service (MBMS); Architecture and functional description (Release 13)", Dec. 2015.
3GPP TS 23.228 V13.4.0, "3rd Generation Partnership Project; Technical Specification Group Services and System Aspects; IP Multimedia Subsystem (IMS); Stage 2 (Release 13)", Sep. 2015.
IETF RFC 5944, "IP Mobility Support for IPv4, Revised", Nov. 2010.
IETF RFC 6275, "Mobility Support in IPv6", Jul. 2011.
3GPP TS 26.092 V13.0.0, "3rd Generation Partnership Project; Technical Specification Group Services and System Aspects; Mandatory speech codec speech processing functions; Adaptive Multi-Rate (AMR) speech codec; Comfort noise aspects (Release 13)", Dec. 2015.

* cited by examiner

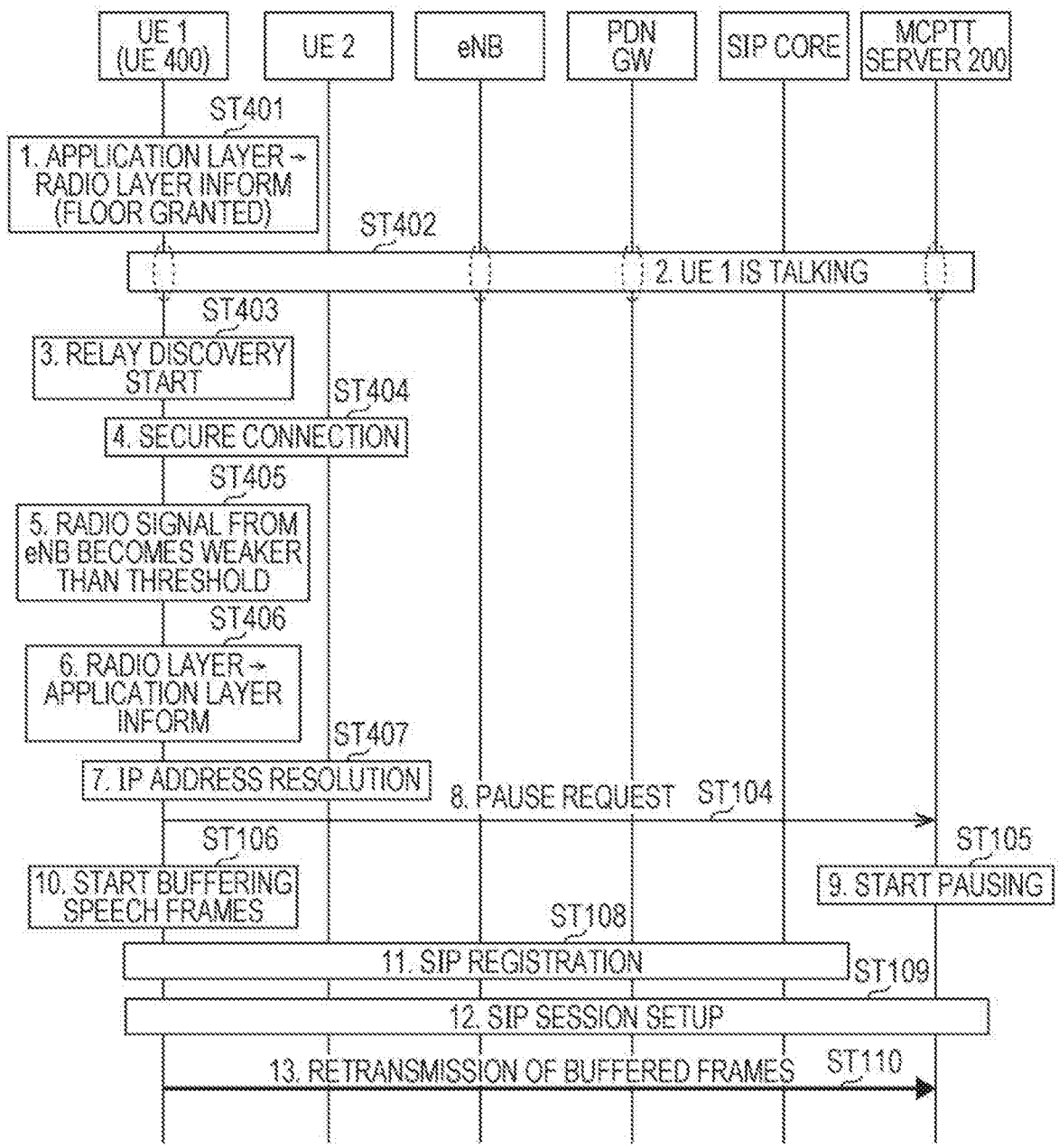

COMMUNICATION SYSTEM, TERMINAL, AND COMMUNICATION CONTROL METHOD

BACKGROUND

1. Technical Field

The present disclosure relates to a communication system, a terminal, and a communication control method.

2. Description of the Related Art

In the 3rd Generation Partnership Project (3GPP), standardization of Mission Critical Push To Talk (MCPTT) is currently ongoing.

3GPP TS 22.179 v13.3.0, "Mission Critical Push to Talk (MCPTT) over LTE; Stage 1" describes prerequisites to formulating services and system details of the MCPTT. In 3GPP TS 22.179 v13.3.0, "Mission Critical Push to Talk (MCPTT) over LTE; Stage 1", services using an on-network service, an off-network service, and both the on-network and off-network services are contemplated as MCPTT services.

The on-network service is a service using Group Communication System Enablers for LTE (GCSE_LTE; see, for example, 3GPP TS 22.468 v13.0.0, "Group Communication System Enablers for LTE (GCSE_LTE)" and 3GPP TS 23.468 v13.3.0, "Group Communication System Enablers for LTE (GCSE_LTE); Stage 2"). 3GPP TS 22.468 v13.0.0, "Group Communication System Enablers for LTE (GCSE_LTE)" and 3GPP TS 23.468 v13.3.0, "Group Communication System Enablers for LTE (GCSE_LTE); Stage 2" state that in communication using the GCSE_LTE, terminals (user equipment: UE) participating in a group service such as the MCPTT may perform unicast communication using an Evolved Packet System (EPS) bearer described in 3GPP TS 23.401 v13.5.0, "General Packet Radio Service (GPRS) enhancements for Evolved Universal Terrestrial Radio Access Network (E-UTRAN) access" or 3GPP TS 36.300 v13.2.0, "Evolved Universal Terrestrial Radio Access (E-UTRA) and Evolved Universal Terrestrial Radio Access Network (E-UTRAN); Overall description; Stage 2", or may perform multimedia broadcast and multicast service (MBMS) communication using an MBMS bearer described in 3GPP TS 23.246 v13.3.0, "Multimedia Broadcast/Multicast Service (MBMS); Architecture and functional description".

The off-network service is a service using proximity services (ProSe: see, for example, 3GPP TS 22.278 v13.2.0, "Service requirements for the Evolved Packet System (EPS)", 3GPP TR 23.713 v13.0.0, "Study on extended architecture support for proximity services", 3GPP TS 23.303 v13.2.0, "Proximity-based Services (ProSe); Stage 2", and 3GPP TS 36.321 v12.6.0, "Evolved Universal Terrestrial Radio Access (E-UTRA); Medium Access Control (MAC) protocol specification"), which is device-to-device direct communication. The ProSe communication is sometimes called sidelink communication.

Examples of the service using both the on-network and off-network services include a service using a UE-to-network relay described, for example, in 3GPP TS 22.179 v13.3.0, "Mission Critical Push to Talk (MCPTT) over LTE; Stage 1", 3GPP TS 23.303 v13.2.0, "Proximity-based services (ProSe); Stage 2", and 3GPP TS 23.179 v13.0.0, "Functional architecture and information flows to support mission critical communication services; Stage 2". The service using a UE-to-network relay refers to a service in which a UE located in a coverage of a base station (eNB: eNode B) functions as a relay UE relaying communication with a UE (remote UE) located outside the eNB coverage and the EPS. In this service, the off-network service using the ProSe communication is provided between the relay UE and the remote UE, while the on-network service using the GCSE_LTE is provided between the relay UE and an Evolved Packet Core (EPC; hereinafter, also described as Packet Core). This relay UE functions as a Layer 3 relay, namely, a Layer 3 router for the remote UE.

UEs of users provided with the MCPTT service belong to a group of the MCPTT service, as described in 3GPP TS 22.179 v13.3.0, "Mission Critical Push to Talk (MCPTT) over LTE; Stage 1". The number of groups to which each UE belongs may be more than one.

In the MCPTT service, floor control is required to be supported, which permits only a user with a floor granted in the group to talk. The time to talk with the floor granted may be restricted. In an emergency and other similar situation, this service is required to permit pre-emption. In case of the pre-emption, an ongoing MCPTT service is suspended and the floor is assigned to the pre-emption. 3GPP TR 23.779 v13.0.0, "Study on application architecture to support Mission Critical Push To Talk over LTE (MCPTT) services" and 3GPP TS 23.179 v13.0.0, "Functional architecture and information flows to support mission critical communication services; Stage 2" disclose examples of registration with MCPTT service groups, the floor control, architecture of the MCPTT service including resource allocation to a network, and signaling.

As stated in 3GPP TS 23.179 v13.0.0, "Functional architecture and information flows to support mission critical communication services; Stage 2", the above-mentioned unicast communication is used for uplink media data (such as audio and video; referred to as "data" hereunder) sent from the UE to an MCPTT server (to be described later), while for downlink data sent from the MCPTT server to the UE, the unicast communication, the MBMS communication, or both communications are available for use.

SUMMARY

Along with movement of a UE to the inside or outside of the eNB coverage area, a radio connection destination of this UE is switched between the eNB and the relay UE. If the radio connection destination of a UE of a user currently talking with a floor granted is switched, the UE cannot transmit data to the MCPTT server until a new session after the switching is started. Thus, the uplink data sent from the UE to the MCPTT server is discarded when the radio connection destination of the UE with a floor granted is switched, resulting in a problem that the data is not delivered to the other UEs participating in the MCPTT service.

One non-limiting and exemplary embodiment provides a communication system, a terminal, and a communication control method that suppress an amount of data to be discarded, even when the radio connection destination of the UE is switched.

In one general aspect, the techniques disclosed here feature a communication system including: of a plurality of terminals, a first terminal with a floor granted that transmits data to a communication node; and a second terminal that receives the data from the communication node, in which the first terminal uses either of a first service performing communication with the communication node in radio connection with a base station, or a second service performing communication with the communication node in radio connection with a relay terminal, and when switching a radio connection destination from the base station to the relay terminal during use of the first service, or when switching the radio connection destination from the relay terminal to the base station during use of the second service, the first terminal buffers the data generated during the switching of the radio connection destination, and after completion of the switching of the radio connection destination, the first terminal transmits the buffered data to the communication node.

It should be noted that general or specific embodiments may be implemented as a system, a device, a method, an integrated circuit, a computer program, a storage medium or any selective combination thereof.

According to one aspect of the present disclosure, the amount of data to be discarded may be suppressed even when the radio connection destination of the UE is switched.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 11 is a sequence chart illustrating an operation of switching the radio connection destination according to Embodiment 3.

DETAILED DESCRIPTION (Underlying Knowledge Forming Basis of the Present Disclosure)

The underlying knowledge forming the basis of the present disclosure will first be described.

Figure 1:
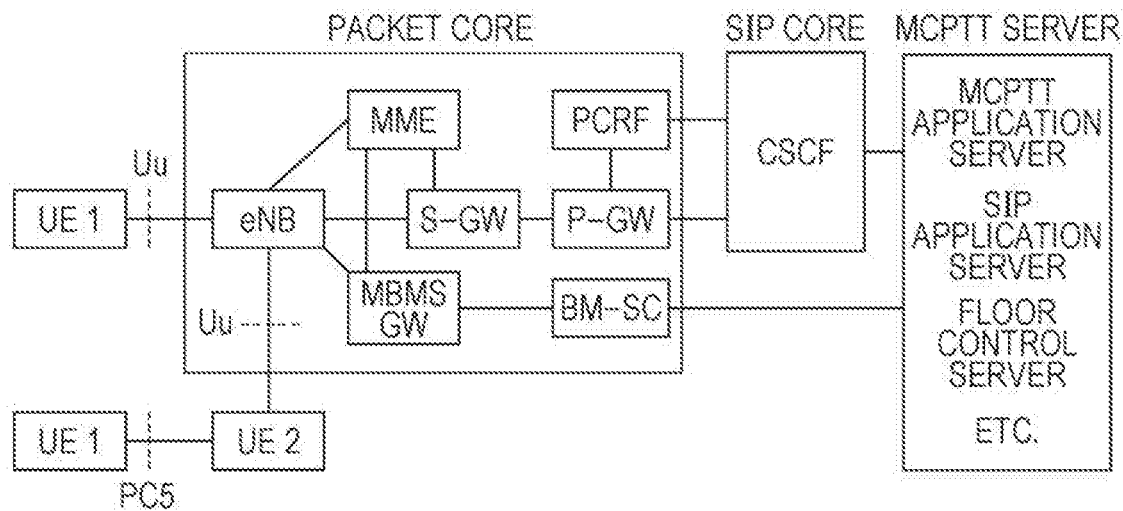
FIG. 1 is a diagram illustrating an exemplary architecture of a UE-to-network relay in an MCPTT service.

FIG. 1 is a partially simplified diagram of an architecture of a UE-to-network relay in an MCPTT service described in 3GPP TS 23.179 v13.0.0, "Functional architecture and information flows to support mission critical communication services; Stage 2". It is described in 3GPP TS 23.179 v13.0.0, "Functional architecture and information flows to support mission critical communication services; Stage 2" that elements other than those depicted in FIG. 1 configure the MCPTT service. However, they are omitted here.

An MCPTT server illustrated in FIG. 1 has, for example, a session initiation protocol (SIP) application server function, a floor control server function that controls the floor, and an MCPTT application server function that once terminates data from a talker and transfers the data to participants participating in the MCPTT service. Although in FIG. 1, these functions each are assumed to reside as part of the MCPTT server functions for simplified illustration, the server and functions may reside while distributed in other nodes having different names.

A SIP core illustrated in FIG. 1 has, for example, a call session control function (CSCF) that performs routing of a SIP server or SIP signaling, for example, which is described in 3GPP TS 23.228 v13.4.0 "IP Multimedia Subsystem (IMS); Stage 2".

Packet Core illustrated in FIG. 1 has, for example, a Policy and Charging Rules Function (PCRF), a Packet Data Network Gateway (P-GW), a Serving Gateway (S-GW), a Mobility Management Entity (MME), and eNB, which are described in 3GPP TS 23.401 v13.5.0, "General Packet Radio Service (GPRS) enhancements for Evolved Universal Terrestrial Radio Access Network (E-UTRAN) access", as well as a Broadcast Multicast Service Center (BM-SC) and an MBMS gateway (MBMS GW), which are described in 3GPP TS 23.246 v13.3.0, "Multimedia Broadcast/Multicast Service (MBMS); Architecture and functional description".

Next, procedures in which a UE of a currently talking user obtains a floor and switches a radio connection destination from under an eNB to under a relay UE, will be described with reference to FIGS. 1 and 2. These procedures are based on 3GPP TS 23.303 v13.2.0, "Proximity-based services (ProSe); Stage 2", 3GPP TS 23.179 v13.0.0, "Functional architecture and information flows to support mission critical communication services; Stage 2", and others.

Assume that a plurality of UEs (not illustrated) including a UE 1 and a UE 2 are currently participating in the MCPTT service. The UE 1 and the UE 2, at first, are in radio connection directly with the eNB via a Uu interface described in 3GPP TS 36.300 v13.2.0, "Evolved Universal Terrestrial Radio Access (E-UTRA) and Evolved Universal Terrestrial Radio Access Network (E-UTRAN); Overall description; Stage 2".

Figure 2:
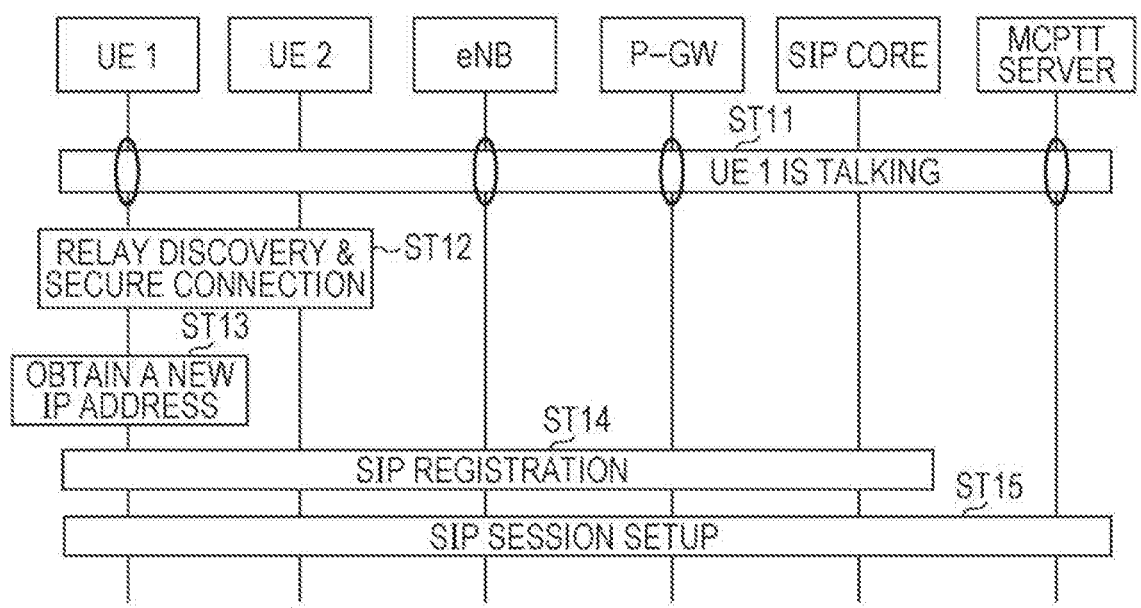
FIG. 2 is a sequence chart illustrating an operation example of switching a radio connection destination of a UE.

In FIG. 2, the UE 1 obtains a floor from the MCPTT server to talk (ST11). That is, the UE 1 transmits uplink data to the MCPTT server. The MCPTT server transmits the data received from the UE 1 to the other UEs participating in the same MCPTT service as that of the UE 1.

If the UE 1 is likely to go out of an eNB coverage area, the UE 1 performs relay UE discovery (relay discovery) that is a detection procedure of a relay UE for the UE 1, via a PC5 interface (ST12) described in 3GPP TS 36.300 v13.2.0, "Evolved Universal Terrestrial Radio Access (E-UTRA) and Evolved Universal Terrestrial Radio Access Network (E-UTRAN); Overall description; Stage 2". In FIG. 2, the UE 2 is discovered as the relay UE for the UE 1. The UE 1 then performs secure connection with the UE 2 via the PC5 interface (ST12). The UE 1 obtains information necessary for an IP address to be used in a subnetwork under an UE 2 or generation of the IP address, via the PC5 interface from the UE 2, and performs radio connection (ST13).

The UE 1 uses a newly obtained or generated IP address to be registered with the SIP core via the PC5 interface with the UE 2 (SIP registration) (ST14). Then, the UE 1 performs session setup for starting a session for the MCPTT service (ST15). This session setup allows a unicast bearer for the UE 1 under UE 2 to be established and the session is started.

Note that the UE 1 cannot transmit data to the MCPTT server for a period of time from when the UE 1 obtains or generates the IP address to be used under the UE 2 to when the session setup is completed and the unicast bearer for the UE 1 under UE 2 is established (during ST13 to ST15 illustrated in FIG. 2, for example). This causes a problem that uplink data generated in the UE 1 for this period of time may be discarded, so that all UEs participating in the MCPTT service cannot receive the data transmitted for this period of time. This problem occurs similarly when the UE 1 switches the radio connection destination from under the UE 2 to under the eNB.

IETF RFC 5944, "IP Mobility Support for IPv4, Revised" or IETF RFC 6275, "Mobility Support in IPv6" describes Mobile IP as a technique to continuously use an IP address before change of the IP address due to UE transfer, even after the change. The technique described in IETF RFC 5944, "IP Mobility Support for IPv4, Revised" or IETF RFC 6275, "Mobility Support in IPv6" is applied to the MCPTT service to possibly enable an amount of data to be discarded when the UE switches the radio connection destination, to be suppressed. However, to use the technique of IETF RFC 5944, "IP Mobility Support for IPv4, Revised" or IETF RFC 6275, "Mobility Support in IPv6", a considerable change is needed for not only the UE but also a node of the Packet Core.

An aspect of the present disclosure therefore aims to suppress the amount of data to be discarded without applying a change to the Packet Core, even when the radio connection destination is switched between the eNB and the relay UE, during the transmission of the uplink data by the UE in the MCPTT server.

Embodiments of the present disclosure will be described below in detail with reference to the drawings.

(Embodiment 1)

A method for switching the radio connection destination by the UE according to the present embodiment will be described below using FIGS. 1 and 3 to 6.

[Configuration of Communication System]

A communication system according to the present embodiment has the configuration illustrated in FIG. 1. The communication system according to the embodiment includes at least a UE 100 (UE 1 illustrated in FIG. 1, for example) and an MCPTT server 200 (communication node). In the communication system of this embodiment, of a plurality of UEs participating in the MCPTT service, a UE with a floor granted (UE 100, for example) transmits data to the MCPTT server 200, while the UEs other than the UE 100 receive the data from the MCPTT server 200.

The architecture and prerequisites for the MCPTT service in the present embodiment are as described above. In other words, the MCPTT server 200 (MCPTT Server in FIG. 1) has, for example, the SIP application server function, the floor control server function, and the MCPTT application server function. The SIP core has the CSCF function, for example. The Packet Core has, for example, the PCRF, the P-GW, the S-GW, the eNB, the BM-SC, and the MBMS GW.

In a scenario assumed in the present embodiment, the plurality of UEs (not illustrated) including the UE 1 (UE 100) and the UE 2 are currently participating in the MCPTT service through the above-mentioned architecture. The UE 2 performs radio connection with the eNB via the Uu interface to thereby communicate with the SIP core or the MCPTT server 200 through the Packet Core. The UE 1 also performs radio connection directly with the eNB via the Uu interface, or by using the UE 2 as a relay UE (relay node), performs radio connection with the UE 2 via the PC5 interface to thereby communicate with the SIP core or the MCPTT server 200 through the Packet Core. That is, the UE 1 uses either of an on-network service or a service using a UE-to-network relay and transmits uplink data to the MCPTT server 200.

[UE Protocol Stack]

Figure 3:
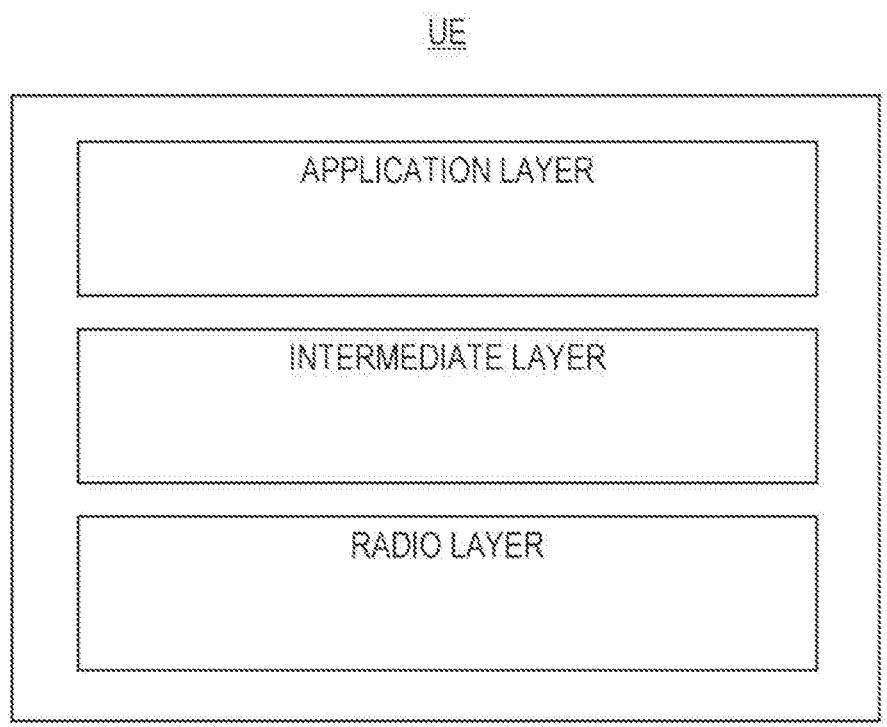
FIG. 3 is a diagram illustrating an example of a UE protocol stack.

FIG. 3 illustrates an example of the UE protocol stack. The UE protocol stack is composed of a radio layer, an intermediate layer, and an application layer. The radio layer includes protocols such as a Physical layer (PHY), a Medium Access Control (MAC), a Radio Link Control (RLC), a Packet Data Convergence Protocol (PDCP), and a Radio Resource Control (RRC), which are described in 3GPP TS 36.300 v13.2.0, "Evolved Universal Terrestrial Radio Access (E-UTRA) and Evolved Universal Terrestrial Radio Access Network (E-UTRAN); Overall description; Stage 2". The radio layer transfers data, transmits and receives signaling between the eNB and the UE, and also has a function to control the radio connection, for example.

The intermediate layer includes, for example, a Non-Access Stratum (NAS) protocol described in 3GPP TS 23.401 v13.5.0, "General Packet Radio Service (GPRS) enhancements for Evolved Universal Terrestrial Radio Access Network (E-UTRAN) access", transmits and receives signaling with the Packet Core and also has a function to control a bearer. Additionally, the intermediate layer includes protocols such as an Internet Protocol (IP), a User Datagram Protocol (UDP), a Transmission Control Protocol (TCP), and a Real-time Transport Protocol (RTP), and also has a function necessary to transmit and receive data in the application layer.

The application layer includes the SIP protocol and a protocol for the floor control, for example, and also has a function necessary to control services such as the MCPTT, or a function necessary to generate data such as for an encoder and a decoder of an audio or video codec.

[Configuration of Each Device]

Figure 4:
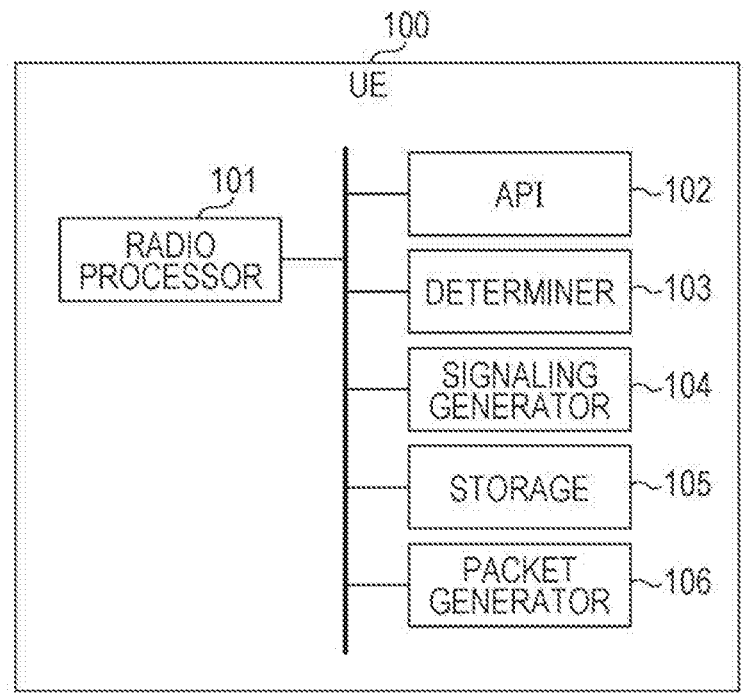
FIG. 4 is a block diagram illustrating a configuration example of a UE according to Embodiment 1.
Figure 5:
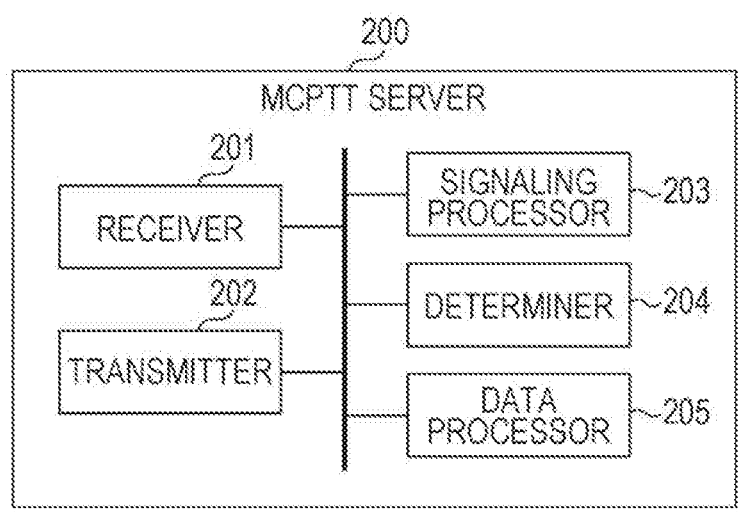
FIG. 5 is a block diagram illustrating a configuration example of an MCPTT server according to Embodiment 1.

FIGS. 4 and 5 are block diagrams illustrating configuration examples of the UE 100 (UE 1 in FIG. 1, for example) and the MCPTT server 200, respectively. The UE 100 and the MCPTT server 200 have functions described in 3GPP TS 22.179 v13.3.0, "Mission Critical Push to Talk (MCPTT) over LTE; Stage 1", 3GPP TS 22.468 v13.0.0, "Group Communication System Enablers for LTE (GCSE_LTE)", 3GPP TS 23.468 v13.3.0, "Group Communication System Enablers for LTE (GCSE_LTE); Stage 2", 3GPP TS 22.278 v13.2.0, "Service requirements for the Evolved Packet System (EPS)", 3GPP TR 23.713 v13.0.0, "Study on extended architecture support for proximity services", 3GPP TS 23.303 v13.2.0, "Proximity-based services (ProSe); Stage 2", 3GPP TS 36.321 v12.6.0, "Evolved Universal Terrestrial Radio Access (E-UTRA); Medium Access Control (MAC) protocol specification", 3GPP TR 23.779 v13.0.0, "Study on application architecture to support Mission Critical Push To Talk over LTE (MCPTT) services", 3GPP TS 23.179 v13.0.0, "Functional architecture and information flows to support mission critical communication services; Stage 2", 3GPP TS 23.401 v13.5.0, "General Packet Radio Service (GPRS) enhancements for Evolved Universal Terrestrial Radio Access Network (E-UTRAN) access", and 3GPP TS 36.300 v13.2.0, "Evolved Universal Terrestrial Radio Access (E-UTRA) and Evolved Universal Terrestrial Radio Access Network (E-UTRAN); Overall description; Stage 2", in addition to those of the configurations illustrated in FIGS. 4 and 5, but the descriptions thereof will be omitted here.

The UE 100 illustrated in FIG. 4 includes a radio processor 101, an application programming interface (API) 102, a determiner 103, a signaling generator 104, a storage 105, and a packet generator 106.

The radio processor 101 belongs to the radio layer; the determiner 103, the signaling generator 104, and the storage 105 belong to the application layer; and the packet generator 106 belongs to the intermediate layer or both the application layer and the intermediate layer. The API 102 is an interface between the radio layer and the application layer.

The radio processor 101 receives an IP packet and outputs signaling (information of the radio layer) contained in the IP packet to the API 102. The radio processor 101 also transmits the signaling or the IP packet received from the API 102 or the packet generator 106.

The radio processor 101 determines whether the UE 100 is in a coverage area of the eNB. If the UE 100 is likely to go out of the eNB coverage area, for example, the radio processor 101 determines to implement the relay UE discovery (relay discovery) and outputs information indicating the implementation of the relay UE discovery (information of the radio layer) to the API 102.

The API 102 outputs the information of the radio layer (radio processor 101, for example) to the application layer (determiner 103, for example) and outputs the information of the application layer to the radio layer (radio processor 101, for example).

The determiner 103 performs determination for the application layer based on the information of the radio layer received from the application layer or the API 102.

For example, the determiner 103 determines whether the UE 100 switches the radio connection destination between the eNB and the relay UE. If the UE 100 switches the radio connection destination, then the determiner 103 determines to stop transmission of uplink data generated during the switching of the radio connection destination, and store (buffer) the uplink data in the storage 105. Moreover, the determiner 103 determines that the transmission of the uplink data is resumed after the switching of the radio connection destination is completed (that is, after a session at the switched destination is started).

The signaling generator 104 generates signaling based on the determination result of the determiner 103. For example, when the determiner 103 determines to switch the radio connection destination, the signaling generator 104 generates signaling to inform the switching of the radio connection destination. In other words, this signaling indicates that the UE 100 stops transmitting the uplink data.

When the determiner 103 determines to stop transmitting the uplink data, the storage 105 buffers the data generated in the application layer. Moreover, the storage 105, when the determiner 103 determines to resume transmitting the uplink data, outputs the buffered data to the packet generator 106.

The packet generator 106 packetizes into an IP packet, the uplink data generated in the application layer or the data stored in the storage 105 and the signaling, and outputs the IP packet to the radio processor 101.

The MCPTT server 200 illustrated in FIG. 5 includes a receiver 201, a transmitter 202, a signaling processor 203, a determiner 204, and a data processor 205.

The receiver 201 receives the IP packet, outputs the signaling contained in the IP packet to the signaling processor 203, and outputs the uplink data contained in the IP packet to the data processor 205.

The transmitter 202 transmits the signaling received from the signaling processor 203 or downlink data received from the data processor 205 to, for example, the plurality of UEs participating in the MCPTT service.

The signaling processor 203 performs a procedure based on the content of the signaling sent from the UE 100, for example. The signaling processor 203 also generates signaling to be sent to the UE 100 and outputs the signaling to the transmitter 202.

The determiner 204 performs procedural determination based on the content of the signaling processed in the signaling processor 203. For example, when the UE 100 receives signaling indicating switching of the radio connection destination (or stop of uplink data transmission), the determiner 204 determines that the transmission of the uplink data from the UE 100 is paused. Moreover, the determiner 204, when a new session for the UE 100 is started after the transmission of the uplink data is stopped, determines that the transmission of the uplink data from the UE 100 is to be resumed.

The data processor 205 performs a procedure for the uplink data received from the receiver 201 and the downlink data sent to the UEs, based on the determination result of the determiner 204.

[Operation of Communication System]

The operation of the communication system configured as above will be described in detail.

<Case 1: Switching of Radio Connection Destination from Under eNB to Under Relay UE by UE>

Figure 6:
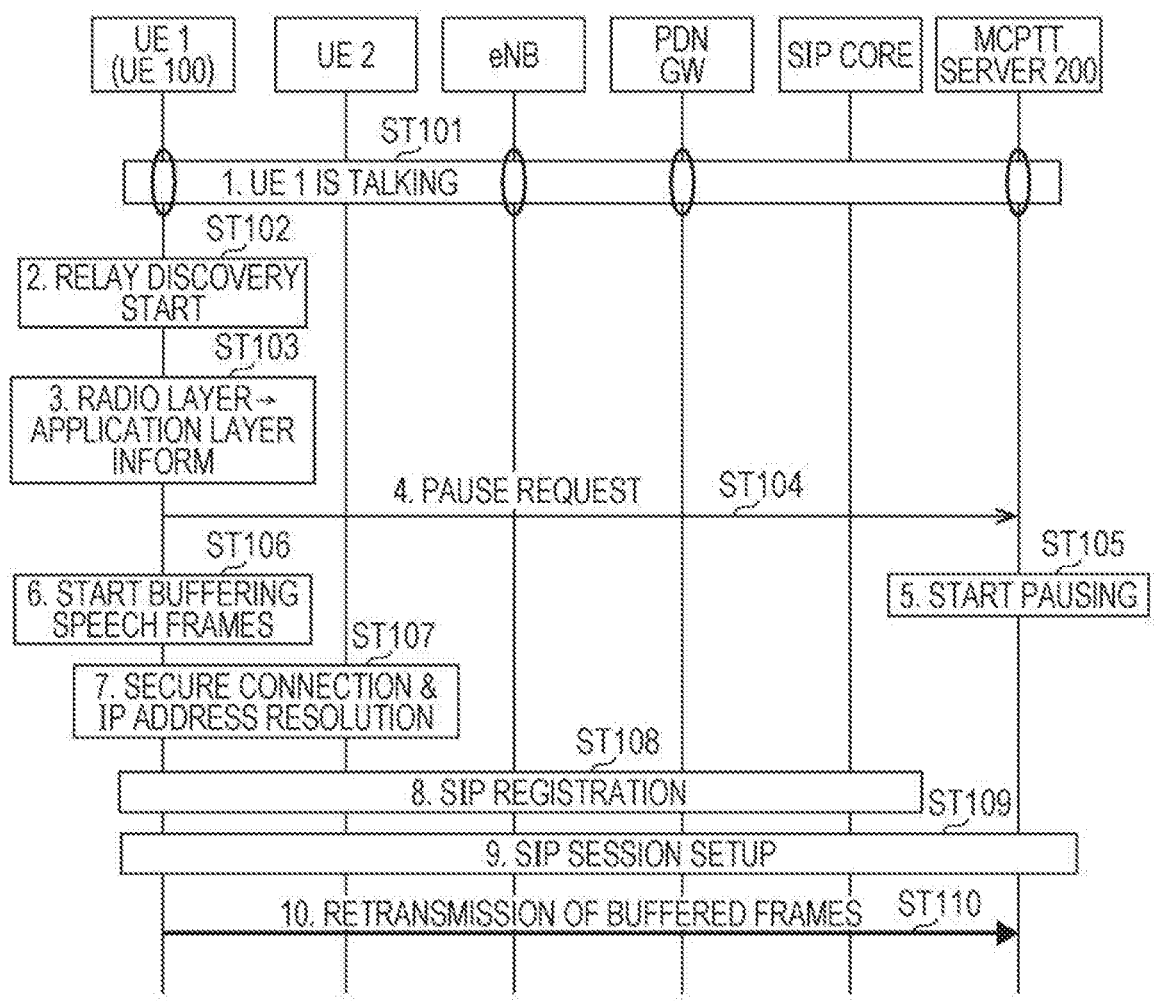
FIG. 6 is a sequence chart illustrating an operation of switching the radio connection destination according to Embodiment 1.

FIG. 6 is a sequence chart illustrating an operation example of switching the radio connection destination from under the eNB to under the relay UE (UE 2) by the UE 100, according to the present embodiment.

In FIG. 6, the UE 1 (UE 100) first performs radio connection with the eNB via the Uu interface to be in communication with the SIP core or the MCPTT server 200 through the Packet Core (eNB, PDN GW, for example).

The UE 1 obtains a floor from the MCPTT server 200 and talks (ST101). That is, the UE 1 transmits uplink data to the MCPTT server 200. The MCPTT server 200 transmits the data received from the UE 1 to the other UEs participating in the same MCPTT service as that of the UE 1.

The radio layer of the UE 1 (radio processor 101), when detecting that the UE 1 is likely to go out of the eNB coverage area, determines that the relay UE discovery (relay discovery) is started via the PC5 interface (ST102) described in 3GPP TS 36.300 v13.2.0, "Evolved Universal Terrestrial Radio Access (E-UTRA) and Evolved Universal Terrestrial Radio Access Network (E-UTRAN); Overall description; Stage 2".

The radio layer of the UE 1 (radio processor 101) outputs information indicating that relay discovery is started (or has been started), to the application layer (determiner 103) through the API 102 (ST103). The determiner 103 of the UE 1 determines that the uplink data generated in an unillustrated encoder (audio data, for example) is buffered in the storage 105 until the session under the relay UE is started while the uplink data is not packetized into an IP packet and is not transmitted, based on the information received from the radio layer at ST103 and the information indicating that the UE 1 is currently transmitting the data following the receipt of the floor at ST101.

That is, when the UE 100 is using the on-network service in connection with the eNB, the determiner 103 of the UE 100 determines to switch the radio connection destination of the UE 100 by starting relay discovery. The data generated during the switching of the radio connection destination is buffered in the storage 105.

The signaling generator 104 of the UE 1 generates signaling (pause request) to inform the MCPTT server 200 that the radio connection destination is to be switched, that is, the data is to be stored in the storage 105 without transmission, based on the determination result of the determiner 103. This signaling is packetized into an IP packet in the packet generator 106 to transmit the IP packet to the MCPTT server 200 from the radio processor 101 (ST104).

The receiver 201 of the MCPTT server 200 outputs the received signaling (pause request) to the signaling processor 203. The signaling processor 203 outputs the content of the signaling to the determiner 204. The determiner 204 determines based on the received signaling, that the data from the UE 1 is not transmitted until the UE 1 completes switching the radio connection destination to under the relay UE (in other words, until the session under the relay UE is started). The determiner 204 then instructs the data processor 205 to pause the data receiving procedure and the data transmission procedure to the other UEs participating in the MCPTT service (ST105) other than the UE 1. At this time, the data processor 205 may perform a procedure of, for example, extending the size of a receiving buffer or a transmitting buffer on the assumption that the data is to be transmitted collectively after the data transmission from the UE 1 is resumed.

The storage 105 of the UE 1 starts buffering the encoded data such as speech frame (ST106).

The UE 1 establishes secure connection between the UE 1 and the UE 2 upon discovery of the UE 2 as a relay UE (ST107). Additionally, the UE 1 obtains from the UE 2, information necessary for an IP address to be used in the subnetwork under the UE 2 or generation of the IP address (ST107). The UE 1 uses the information necessary for generation of the IP address and generates the IP address.

The UE 1 uses the obtained or generated IP address at ST107 to be registered with the SIP core via the PC5 interface with the UE 2 (ST108).

Upon the registration with the SIP core, the UE 1 performs SIP session setup for starting the session for the MCPTT service (ST109). Completion of the SIP session setup allows a unicast bearer for the UE 1 under UE 2 to be newly established.

The application layer of the UE 1 (determiner 103), when receiving a SIP session setup completion message (200 OK described in 3GPP TS 23.228 v13.4.0 "IP Multimedia Subsystem (IMS); Stage 2", for example), determines that the unicast bearer for the UE 1 has been established and instructs the storage 105 to stop buffering the uplink data.

The storage 105 of the UE 1 then outputs the buffered data to the packet generator 106 and outputs data newly generated thereafter by the encoder successively to the packet generator 106. The packet generator 106 packetizes the data received from the storage 105 into an IP packet by using a new IP address (IP address used under the UE 2). The radio processor 101 then transmits the IP packet to the MCPTT server 200 (ST110). That is, the radio processor 101 of the UE 1 transmits the data buffered in the storage 105 to the MCPTT server 200 after the completion of the switching of the radio connection destination of the UE 1.

The determiner 204 of the MCPTT server 200 transmits the SIP session setup completion message to the UE 1 in the SIP session setup at ST109 and instructs the data processor 205 to release the pause of the data procedure. That is, the determiner 204 determines that the data transmission from the UE 1 is resumed when the switching of the radio connection destination of the UE 1 is completed.

As is described above, when the radio connection destination is switched from under the eNB to under the relay UE, the UE 100 stops transmitting the uplink data generated during a period unable to perform communication by the UE 100 from when the UE 100 obtains or generates the IP address used under the relay UE to when the session under the relay UE is started, and buffers the uplink data. The session under the relay UE is started, then the UE 100 transmits the buffered data to the MCPTT server 200.

This prevents the data that cannot be transmitted by the UE 1 due to the switching of the radio connection destination from being discarded, and the data is transmitted to the MCPTT server 200 after a new session following the switching is started. Thus, the UEs participating in the MCPTT service can receive the uplink data present at the time of switching the radio connection destination of the UE 1.

<Case 2: Switching of Radio Connection Destination from Under Relay UE to Under eNB by UE>

Figure 7:
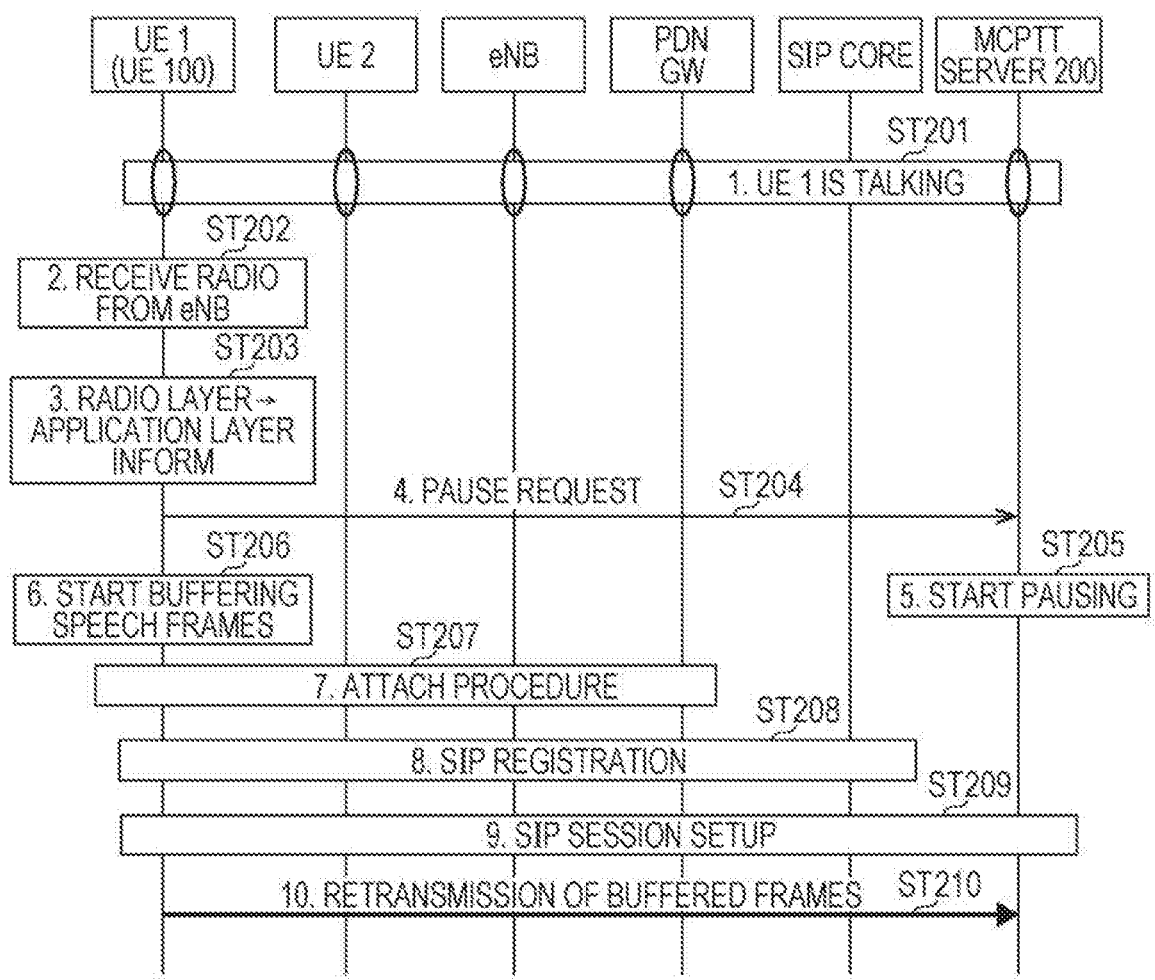
FIG. 7 is a sequence chart illustrating an operation of switching the radio connection destination according to Embodiment 1.

FIG. 7 is a sequence chart illustrating an operation example of switching the radio connection destination from under the relay UE (UE 2) to under the eNB by the UE 100, according to the present embodiment.

In FIG. 7, the UE 1 (UE 100) first performs radio connection with the UE 2 being the relay UE via the PC5 interface to be in communication with the SIP core or the MCPTT server 200 through the Packet Core (eNB, PDN GW, for example).

The UE 1 obtains a floor from the MCPTT server 200 and talks (ST201). That is, the UE 1 transmits uplink data to the MCPTT server 200. The MCPTT server 200 transmits the data received from the UE 1 to the other UEs participating in the same MCPTT service as that of the UE 1.

The radio layer of the UE 1 (radio processor 101) detects that the UE 1 is located in the eNB coverage area, for example, based on a signal from the eNB (ST202).

The radio layer of the UE 1 (radio processor 101) outputs information indicating that the UE 1 is in the eNB coverage area, to the application layer (determiner 103) through the API 102 (ST203). The determiner 103 of the UE 1 determines that the uplink data generated in an unillustrated encoder (audio data, for example) is buffered in the storage 105 until the session under the eNB is started while the uplink data is not packetized into an IP packet and is not transmitted, based on the information received from the radio layer at ST203 and the information indicating that the UE 1 is currently transmitting the data following the receipt of the floor at ST201.

That is, when the UE 100 is using the service using the UE-to-network relay in connection with the relay UE, the determiner 103 of the UE 100 determines to switch the radio connection destination of the UE 100 by detecting the signal from the eNB (reference signal received power (RSRP) and reference signal received quality (RSRQ), which are described in 3GPP TS 36.300 v13.2.0, "Evolved Universal Terrestrial Radio Access (E-UTRA) and Evolved Universal Terrestrial Radio Access Network (E-UTRAN); Overall description; Stage 2", for example). The data generated during the switching of the radio connection destination is buffered in the storage 105.

The signaling generator 104 of the UE 1 generates signaling (pause request) to inform the MCPTT server 200 that the radio connection destination is to be switched, that is, the data is to be stored in the storage 105 without transmission, based on the determination result of the determiner 103. This signaling is packetized into an IP packet in the packet generator 106 to transmit the IP packet to the MCPTT server 200 from the radio processor 101 (ST204).

The receiver 201 of the MCPTT server 200 outputs the received signaling (pause request) to the signaling processor 203. The signaling processor 203 outputs the content of the signaling to the determiner 204. The determiner 204 determines based on the received signaling, that the data from the UE 1 is not transmitted until the UE 1 completes switching the radio connection destination to under the eNB (in other words, until the session under the eNB is started). The determiner 204 then instructs the data processor 205 to pause the data receiving procedure and the data transmission procedure to the UEs participating in the MCPTT service other than the UE 1 (ST205). At this time, the data processor 205 may perform a procedure of, for example, extending the size of a receiving buffer or a transmitting buffer on the assumption that the data is to be transmitted collectively after the data transmission from the UE 1 is resumed.

The storage 105 of the UE 1 starts buffering the encoded data such as speech frame (ST206).

When the intensity or quality of a radio signal from the eNB reaches a reference value or greater, the UE 1 stops communication between the UE 1 and the UE 2 and starts attach procedure (ST207) described in 3GPP TS 23.401 v13.5.0, "General Packet Radio Service (GPRS) enhancements for Evolved Universal Terrestrial Radio Access Network (E-UTRAN) access". By performing the attach procedure, the UE 1 obtains or generates an IP address used under the eNB. Alternatively, a case is conceivable where the UE 1 with a fixed IP address used under the eNB originally held discards the IP address used under the UE 2 to enable the IP address used under the eNB to be reused. Note that depending on the procedure of the IP address to be used (whether to obtain or generate an IP address or to use the fixed IP address held) and the procedure of the bearer used under the eNB when the UE transfers from under the eNB to under the relay UE (detach procedure or S1 release procedure described in 3GPP TS 23.401 v13.5.0, "General Packet Radio Service (GPRS) enhancements for Evolved Universal Terrestrial Radio Access Network (E-UTRAN) access"), the UE does not perform the attach procedure but performs the service request procedure.

The UE 1 uses the obtained or generated IP address at ST207 to be registered with the SIP core via the Uu interface with the eNB (ST208).

Upon the registration with the SIP core, the UE 1 performs SIP session setup for starting the session for the MCPTT service (ST209). Completion of the SIP session setup allows a unicast bearer for the UE 1 under the eNB to be newly established.

The application layer of the UE 1 (determiner 103), when receiving a SIP session setup completion message (200 OK described in 3GPP TS 23.228 v13.4.0 "IP Multimedia Subsystem (IMS); Stage 2", for example), determines that the unicast bearer for the UE 1 has been established and instructs the storage 105 to stop buffering the uplink data.

The storage 105 of the UE 1 then outputs the buffered data to the packet generator 106 and outputs data newly generated thereafter by the encoder successively to the packet generator 106. The packet generator 106 packetizes the data received from the storage 105 into an IP packet by using a new IP address (IP address used under the eNB). The radio processor 101 then transmits the IP packet to the MCPTT server 200 (ST210). That is, the radio processor 101 of the UE 1 transmits the data buffered in the storage 105 to the MCPTT server 200 after the completion of the switching of the radio connection destination of the UE 1.

The determiner 204 of the MCPTT server 200 transmits the SIP session setup completion message to the UE 1 in the SIP session setup at ST209 and instructs the data processor 205 to release the pause of the data procedure. That is, the determiner 204 determines that the data transmission from the UE 1 is resumed when the switching of the radio connection destination of the UE 1 is completed.

As is described above, when the radio connection destination is switched from under the relay UE to under the eNB, the UE 100 stops transmitting the uplink data generated during a period unable to perform communication by the UE 100 from when the UE 100 obtains or generates the IP address used under the eNB to when the session under the eNB is started, and buffers the uplink data. The session under the eNB is started, then the UE 100 transmits the buffered data to the MCPTT server 200.

This prevents the data that cannot be transmitted by the UE 1 due to the switching of the radio connection destination from being discarded, and the data is transmitted to the MCPTT server 200 after the new session following the switching is started. Thus, the UEs participating in the MCPTT service can receive the uplink data present at the time of switching the radio connection destination of the UE 1.

The operations according to the present embodiment have been described above.

In the communication system according to the present embodiment, when switching the radio connection destination between the eNB and the relay UE, the UE 100 with a floor granted buffers the data generated during the switching of the radio connection destination, and after the switching of the radio connection destination is completed, the UE 100 with a floor granted transmits the buffered data to the MCPTT server 200, as has been described.

This enables the uplink data that would be discarded when the UE 100 switches the radio connection destination to be eliminated.

In this embodiment, further, the UE 100 that is a transmission source temporarily stores the uplink data generated at the time of switching the radio connection destination of the UE 100 and transmits the uplink data. That is, timing to transmit the data at the UE 100 is merely shifted and changes in setting or configuration for Packet Core nodes are unnecessary.

According to the present embodiment, the procedures and the configurations described above enable the reduction of the amount of data to be discarded, without applying a change to the Packet Core even when the radio connection destination is switched between the eNB and the relay UE, during the transmission of the uplink data by the UE in the MCPTT server.

In the present embodiment, the UE 100 transmits the signaling indicating that the uplink data is buffered without transmission, to the MCPTT server 200. This enables the MCPTT server 200 to prevent misrecognition that an error has occurred, even when the MCPTT server 200 cannot receive the uplink data from the UE 100 for a predetermined period of time.

In the MCPTT service, on the other hand, unidirectional data transmission is performed from the UE of a user currently talking to the other UEs, for example. Thus, even when the UE 100 participating in the MCPTT service transmits the buffered data after the switching of the radio connection destination, as in the present embodiment, the other UEs receiving this data are less affected. In the case where the MCPTT server 200 holds a certain amount of data from the UE 100 and distributes the data to the other UEs, for example, a delay caused by the above-mentioned UE 100 transmitting the buffered data after the switching of the radio connection destination is cancelled.

The signaling (pause request in FIGS. 6 and 7) indicating the stop of transmitting the uplink data may not be informed to the MCPTT server 200 from the UE 100.

The packet generator 106 of the UE 1 may form the buffered data collectively into one IP packet to output the IP packet to the radio processor 101; form several frames into one IP packet to output the IP packet successively to the radio processor 101; or otherwise form one frame into one IP packet to output the IP packet successively to the radio processor 101. The packet generator 106 may shorten the interval to output the IP packets to the radio processor 101 at this time. The packet generator 106 may, for example, output IP packets containing the buffered data at an interval of 20 msec or less, unlike the ordinary case of outputting IP packets every 20 msec. Moreover, when the format of the IP packet received from the UE 1 is different from a typical format, for example, when a several frames are formed into one packet contrary to a typical one frame-one packet, the data processor 205 of the MCPTT server 200 may convert this several frames-one packet into one frame-one packet, which is the typical format, and transmit this packet to the UEs participating in the MCPTT service other than the UE 1.

In the present embodiment, the application layer of the UE 100 (UE 1) with the floor granted may inform the radio layer that the floor has been granted through the API 102, and the radio layer, only when the radio connection destination is switched while the floor is granted, may inform the application layer of the UE 1 that the switching of the radio connection destination occurs (ST103 in FIG. 6 and ST203 in FIG. 7, for example).

(Embodiment 2)
<Transfer from Under Relay UE to Under eNB by UE>

The case where the UE buffers data in the application layer when switching the radio connection destination from under the relay UE to under the eNB, and transmits the data after the switching (see FIG. 7), has been described in Embodiment 1. On the other hand, in the present embodiment, a method not to perform the attach procedure or the service request procedure until the user of the UE finishes talking at the time of switching the radio connection destination from under the relay UE to under the eNB by the UE, will be described.

Using FIGS. 1, 5, 8, and 9, the method for switching the radio connection destination by the UE according to the present embodiment will be described below.

Figure 8:
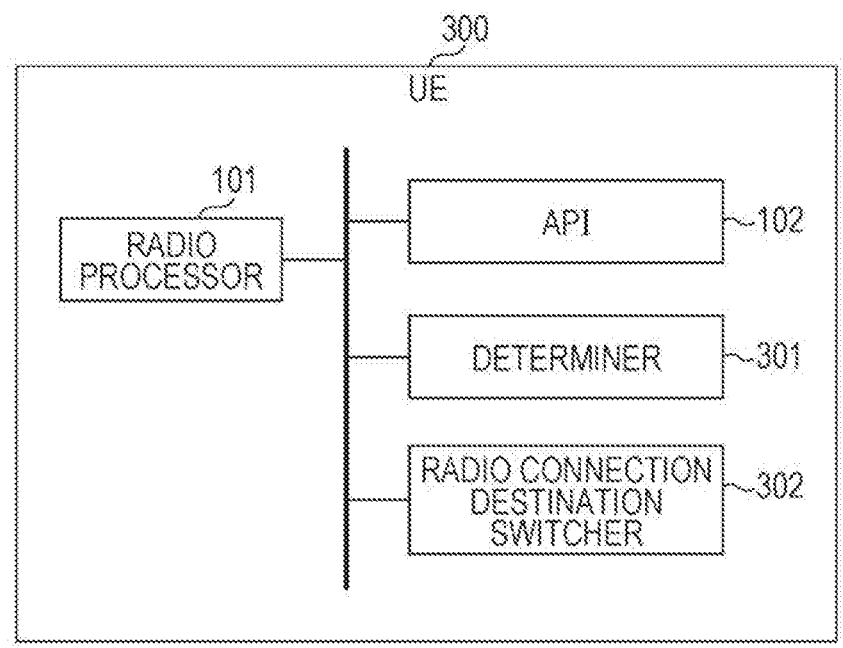
FIG. 8 is a block diagram illustrating a configuration example of a UE according to Embodiment 2.

FIG. 8 is a block diagram illustrating a configuration example of a UE 300 (UE 1 in FIG. 1) according to the present embodiment. In FIG. 8, the same constitutions as those of the UE 100 in Embodiment 1 (FIG. 4) are assigned the same reference numerals and description thereof will be omitted. Moreover, in this embodiment, the MCPTT server 200 has the same configuration as that of Embodiment 1 (FIG. 5) and description thereof will also be omitted.

In the UE 300 depicted in FIG. 8, the radio processor 101 and a determiner 301 belong to the radio layer.

The determiner 301 performs determination for the radio layer based on the information of the application layer received from the radio layer or the API 102.

For example, the determiner 301 determines not to perform the switching of the radio connection destination (attach procedure or service request procedure) until the UE 300 completes transmitting the uplink data (end of talk), when the UE 300 (remote UE) receives from the application layer, information indicating that the user has granted a floor and when the radio processor 101 of the UE 300 detects that the UE 300 has returned inside the eNB coverage area, with, for example, a signal from the eNB. That is, the determiner 301 determines to start the switching of the radio connection destination (attach procedure or service request procedure) after the UE 300 completes transmitting the uplink data (end of talk).

A radio connection destination switcher 302 implements the switching of the radio connection destination (attach procedure or service request procedure, for example) based on the determination result of the determiner 301.

The operation of the communication system configured as above will now be described in detail.

Figure 9:
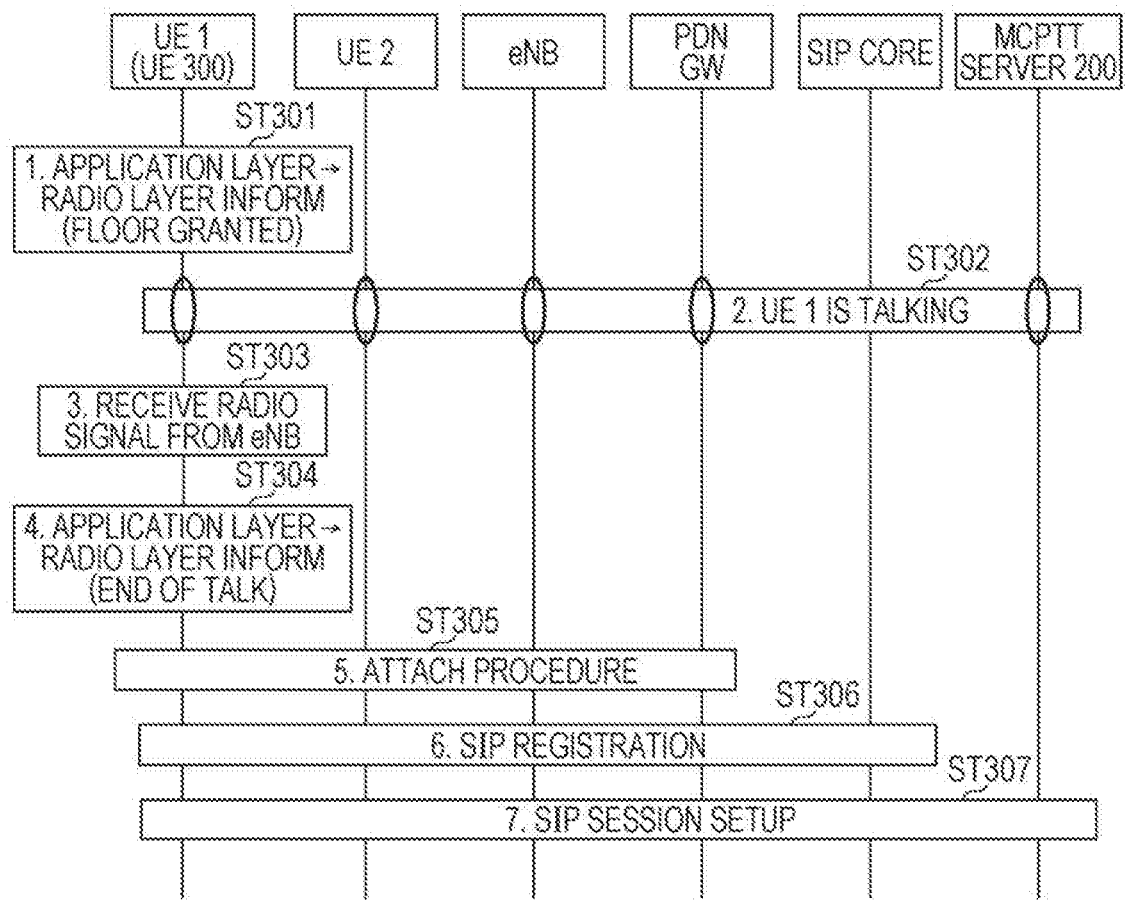
FIG. 9 is a sequence chart illustrating an operation of switching the radio connection destination according to Embodiment 2.

FIG. 9 is a sequence chart illustrating an operation example of switching the radio connection destination from under the relay UE (UE 2) to under the eNB by the UE 300, according to the present embodiment.

In FIG. 9, the UE 1 (UE 300) first performs radio connection with the UE 2 being the relay UE via the PC5 interface to be in communication with the SIP core or the MCPTT server 200 through the Packet Core (eNB, PDN GW, for example).

The UE 1 obtains a floor from the MCPTT server 200. At this time, the API 102 of the UE 1 outputs information indicating that the UE 1 has granted a floor from the application layer to the radio layer (determiner 301) (ST301). A time period for which the floor is permitted (upper limit of the time period permitting a talk) may also be output from the application layer to the radio layer, in addition to the information indicating that the floor has been granted.

The UE 1 talks via the UE 2 (ST302). That is, the UE 1 transmits uplink data to the MCPTT server 200. The MCPTT server 200 transmits the data received from the UE 1 to the other UEs participating in the same MCPTT service as that of the UE 1.

The radio layer of the UE 1 (radio processor 101) detects that the UE 1 is located in the eNB coverage area, for example, based on a signal from the eNB (ST303).

The radio layer of the UE 1 (determiner 301) determines not to switch the radio connection destination to under the eNB until data transmission (talk) with the floor granted is finished, based on the detection result at ST303 and the information indicating that the UE 1 has granted the floor at ST301, and outputs to the radio connection destination switcher 302, information indicating that the radio connection destination is not switched. For example, The determiner 301 instructs the radio connection destination switcher 302 not to transmit to the eNB, a random access request and an RRC connection establishment request described in 3GPP TS 36.300 v13.2.0, "Evolved Universal Terrestrial Radio Access (E-UTRA) and Evolved Universal Terrestrial Radio Access Network (E-UTRAN); Overall description; Stage 2", and the like.

Upon completion of the talk by the UE 1, the API 102 of the UE 1 outputs information indicating that the talk by the UE 1 has finished from the application layer to the radio layer (determiner 301) (ST304). If the time period for which the floor is permitted (upper limit of the time period permitting a talk) has been received at ST301, the determiner 301 may determine the end of the talk by the UE 1 based on the permitted time period. In this case, the procedure of ST304 is unnecessary.

Upon finishing the talk by the UE 1, the determiner 301 of the UE 1 determines to switch the radio connection destination to under the eNB and instructs the radio connection destination switcher 302 to start switching the radio connection destination. For example, the radio connection destination switcher 302 transmits to the eNB, the random access request and the RRC connection establishment request described in 3GPP TS 36.300 v13.2.0, "Evolved Universal Terrestrial Radio Access (E-UTRA) and Evolved Universal Terrestrial Radio Access Network (E-UTRAN); Overall description; Stage 2", and the like. This triggers the UE 1 to switch the radio connection destination to under the eNB and start the attach procedure or the service request procedure described in 3GPP TS 23.401 v13.5.0, "General Packet Radio Service (GPRS) enhancements for Evolved Universal Terrestrial Radio Access Network (E-UTRAN) access" (ST305). By performing the attach procedure or the service request procedure, the UE 1 obtains or generates an IP address used under the eNB. Alternatively, a case is conceivable where the UE 1 with a fixed IP address used under the eNB originally held discards the IP address used under the UE 2 to enable the IP address used under the eNB to be reused.

The UE 1 uses the obtained or generated IP address at ST305 to be registered with the SIP core via the Uu interface with the eNB (ST306).

Upon the registration with the SIP core, the UE 1 performs SIP session setup for starting the session for the MCPTT service (ST307). Completion of the SIP session setup allows a unicast bearer for the UE 1 under the eNB to be newly established.

In the UE 300, the radio layer (determiner 301) adjusts timing to switch the radio connection destination based on the information output from the application layer to the radio layer, as is described above. Specifically, the UE 300 under the relay UE defers the switching the radio connection destination while the floor is granted (or until the talk is finished), even if this radio connection destination can be switched from under the relay UE to under the eNB. In other words, the UE 300 switches the radio connection destination after the talk permitted by the currently granted floor is finished.

This allows the uplink data from the UE 300 to the MCPTT server 200 to be transmitted without being discarded before the switching of the radio connection destination. Thus, the UEs participating in the MCPTT service can receive the uplink data generated in the UE 1 in switching the radio connection destination of the UE 1.

In the present embodiment, timing to switch the radio connection destination of the UE 300 is merely shifted to the time after the completion of the uplink data transmission, and changes in setting or configuration for Packet Core nodes are unnecessary, in the UE 300.

According to the present embodiment, the procedures and the configurations described above enable the reduction of the amount of data to be discarded, without applying a change to the Packet Core even when the radio connection destination is switched between the eNB and the relay UE, during the transmission of the uplink data by the UE in the MCPTT server.

In the present embodiment, the UE 300 (UE 1) may perform a Tracking Area Update procedure described in 3GPP TS 23.401 v13.5.0, "General Packet Radio Service (GPRS) enhancements for Evolved Universal Terrestrial Radio Access Network (E-UTRAN) access", instead of the attach procedure or the service request procedure at ST305, when receiving the downlink data from the MCPTT server 200 by using an MBMS bearer. In this case, the registration with the SIP core at ST306 and the session setup procedure at ST307 are omitted.

(Embodiment 3)
<Transfer from Under eNB to Under Relay UE by UE>

The case where the UE buffers data in the application layer when switching the radio connection destination from under the eNB to under the relay UE, and transmits the data after the switching (see FIG. 7), has been described in Embodiment 1. On the other hand, in the present embodiment, a method to avoid (or delay) obtaining information necessary for an IP address under the relay UE or generation of the IP address as much as possible (until immediately before the connection with the eNB is disconnected), during the talk by the user using a UE when this UE switches the radio connection destination from under the eNB to under the relay UE, will be described.

Using FIGS. 1, 5, 6, 10, and 11, the method for switching the radio connection destination by the UE according to the present embodiment will be described below.

Figure 10:
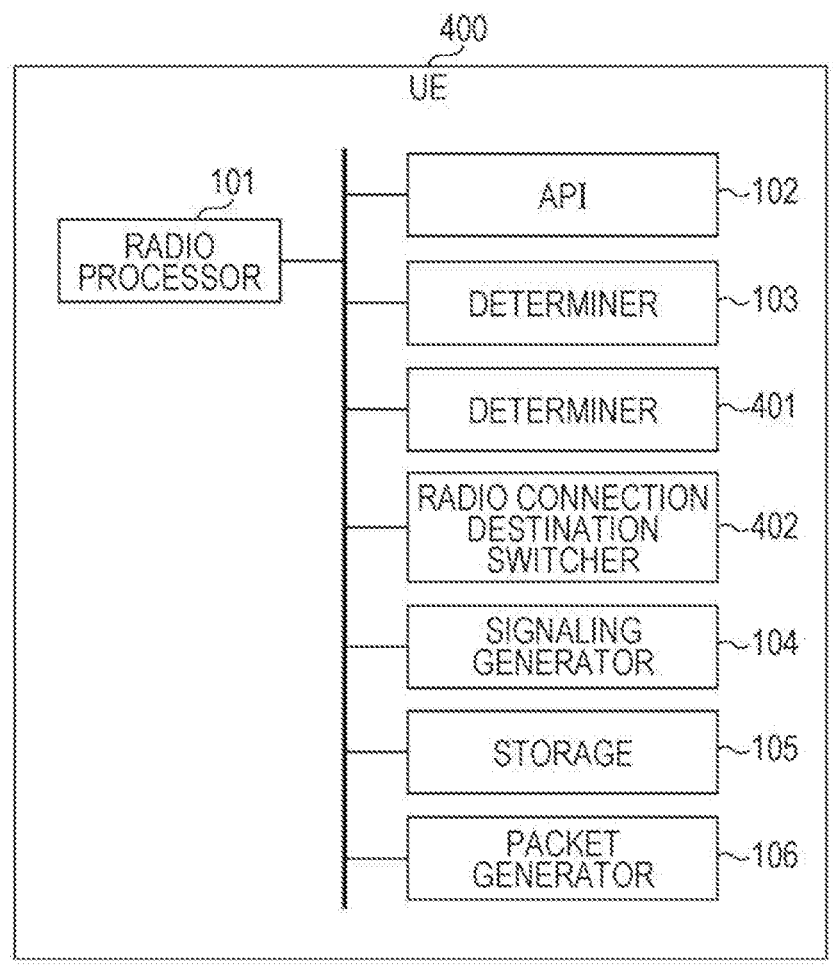
FIG. 10 is a block diagram illustrating a configuration example of a UE according to Embodiment 3.

FIG. 10 is a block diagram illustrating a configuration example of a UE 400 (UE 1 in FIG. 1) according to the present embodiment. In FIG. 10, the same constitutions as those of the UE 100 in Embodiment 1 (FIG. 4) are assigned the same reference numerals and description thereof will be omitted. Moreover, in this embodiment, the MCPTT server 200 has the same configuration as that of Embodiment 1 (FIG. 5) and description thereof will also be omitted.

In the UE 400 depicted in FIG. 10, the radio processor 101 and a determiner 401 belong to the radio layer.

For example, the determiner 401 determines to discover the relay UE or establish secure connection with the discovered relay UE but not to obtain information necessary for an IP address under the relay UE or generation of the IP address, when the UE 400 receives from the application layer, information indicating that the user of the UE 400 has granted a floor and when the radio processor 101 of the UE 400 detects that the UE 400 is likely to go out of the eNB coverage area, with, for example, a signal from the eNB. The determiner 401 determines that the information necessary for the IP address under the relay UE or generation of the IP address needs to be obtained, when the radio processor 101 of the UE 400 detects that the connection with the eNB is about to be disconnected, with a signal from the eNB (for example, detected by a method of detecting that the intensity of the signal from the eNB becomes weaker than a threshold).

A radio connection destination switcher 402 implements the switching of the radio connection destination (relay UE discovery, establishment of the secure connection with the discovered relay UE, and obtainment of the information necessary for an IP address under the relay UE or generation of the IP address, for example) based on the determination result of the determiner 401.

The operation of the communication system configured as above will now be described in detail.

FIG. 11 is a sequence chart illustrating an operation example of switching the radio connection destination from under the eNB to under the relay UE by the UE 400, according to the present embodiment.

In FIG. 11, the UE 1 (UE 400) first performs radio connection with the eNB via the Uu interface to be in communication with the SIP core or the MCPTT server 200 through the Packet Core (eNB, PDN GW, for example).

The UE 1 obtains a floor from the MCPTT server 200. At this time, the API 102 of the UE 1 outputs information indicating that the UE 1 has granted a floor from the application layer to the radio layer (determiner 401) (ST401). A time period for which the floor is permitted (upper limit of the time period permitting a talk) may also be output from the application layer to the radio layer, in addition to the information indicating that the floor has been granted.

The UE 1 talks via the eNB (ST402). That is, the UE 1 transmits uplink data to the MCPTT server 200. The MCPTT server 200 transmits the data received from the UE 1 to the other UEs participating in the same MCPTT service as that of the UE 1.

The radio layer of the UE 1 (radio processor 101), when detecting that the UE 1 is likely to go out of the eNB coverage area, determines that the relay UE discovery (relay discovery) is started via the PC5 interface (ST403) described in 3GPP TS 36.300 v13.2.0, "Evolved Universal Terrestrial Radio Access (E-UTRA) and Evolved Universal Terrestrial Radio Access Network (E-UTRAN); Overall description; Stage 2", based on a signal from the eNB, for example.

The radio layer of the UE 1 (determiner 401) establishes secure connection with the relay UE discovered at ST403 based on the information indicating that the UE 1 has granted a floor at ST401 (ST404). The determiner 401, however, determines not to obtain information necessary for an IP address under the relay UE or generation of the IP address at this point of time.

The radio layer of the UE 1 (radio processor 101) detects that the connection with the eNB is about to be disconnected, for example, by detecting that the signal from the eNB becomes weaker than a threshold (ST405). In this case, the radio layer of the UE 1 (radio processor 101) identifies the information of the radio layer (determiner 401) from the application layer, and when the user of the UE 400 is currently talking, outputs through the API 102 to the application layer (determiner 103), information indicating that relay discovery is started (or has been started) (ST406) as well as obtains the information necessary for an IP address under the relay UE or generation of the IP address (ST407).

The subsequent procedures (ST104 to ST106 and ST108 to ST109) are identical to those in Embodiment 1 (FIG. 6), thus the same reference characters are assigned thereto and the description thereof will be omitted.

When, at ST406, the radio layer of the UE 1 (radio processor 101) identifies the information of the radio layer (determiner 401) from the application layer and finds that the user of the UE 400 has finished talking, the procedures of ST407, ST104, ST105, and ST106 are not performed.

As described above, the UE 400 switches the radio connection destination from under the eNB to under the relay UE immediately before the connection with the eNB is disconnected. This enables the UE 400 to transmit the uplink data to the MCPTT server 200 under the eNB to a maximum extent.

In the case of disconnecting the connection between the UE 400 and the eNB, as with Embodiment 1, the UE 400 stops transmitting the uplink data generated for a period of time unable to perform communication by the UE 400, buffers the uplink data, and upon the start of the session under the relay UE, transmits the buffered data to the MCPTT server 200. This prevents the data that cannot be transmitted by the UE400 due to the switching of the radio connection destination from being discarded, and the data is transmitted to the MCPTT server 200 after a new session following the switching is started. Thus, the UEs participating in the MCPTT service can receive the uplink data present at the time of switching the radio connection destination of the UE400.

The embodiments according to the present disclosure have been described above.

Note that in Embodiments 1 and 3, the MCPTT server 200 may transmit a packet indicating discontinuous transmission (DTX) to the other UEs (other than the UE 1) participating in the MCPTT service, during the pausing procedure at ST105 (FIGS. 6 and 11) and ST205 (FIG. 7). For example, 3GPP TS 26.092 v13.0.0 "Mandatory speech codec speech processing functions; Adaptive Multi-Rate (AMR) speech codec; Comfort noise aspects" describes the DTX.

Although the above-described embodiments describe the MCPTT server as an example, these embodiments may be applied to other services using a similar architecture.

An aspect of the present disclosure is not limited to the embodiments described above and various changes may be applied to any of the embodiments for implementation.

The above embodiments have been described by taking as an example a case of making an aspect of the present disclosure with hardware, but the present disclosure may be implemented by software in cooperation with hardware.

Each functional block used for the description of the above-described embodiments is implemented typically as an LSI being an integrated circuit with input terminals and output terminals. The integrated circuit may include input terminals and output terminals, while controlling each of the functional blocks used in the description of the above embodiments. These functional blocks may be formed into one chip or formed into one chip so as to include part or all of the functions. Although the LSI is taken as an example here, this is called an IC, a system LSI, a super LSI, or an ultra LSI in some cases depending on the degree of integration.

Further, an approach to formation of the integrated circuit is not limited to the LSI but may be implemented by a dedicated circuit or a general-purpose processor. A field programmable gate array (FPGA) or a reconfigurable processor may instead be used. The FPGA and the reconfigurable processor can respectively perform programming and reconfigure connection or setting of circuit cells in the LSI, after the LSI is manufactured.

Moreover, when emerges a technology to form an integrated circuit replaced with the LSI by advance of the semiconductor technology or derivative technologies, such technology may naturally be applied to integrate the functional blocks. Biotechnology may possibly be applied thereto, for example.

One aspect of the present disclosure is useful for a communication system providing the MCPTT service and a user terminal using the communication system.

What is claimed is:

1. A communication system comprising:
a first terminal with a floor granted, the first terminal, in operation, transmits data to a communication node; and
a second terminal, which, in operation, receives the data from the communication node, wherein
the first terminal, in operation, uses either of a first service performing communication with the communication node via a base station, or a second service performing communication with the communication node via a relay terminal,
when switching a radio connection destination from the base station to the relay terminal during use of the first service or from the relay terminal to the base station during use of the second service, the first terminal transmits a pause request to the communication node to pause data transmission from the communication node to the second terminal, and buffers, subsequent to the pause request being transmitted, the data generated during the switching of the radio connection destination, and after completion of the switching of the radio connection destination, the first terminal transmits the buffered data to the communication node.

2. The communication system according to claim 1, wherein when using the first service, the first terminal determines to switch the radio connection destination by starting detection of the relay terminal, and when using the second service, the first terminal determines to switch the radio connection destination by detecting a signal from the base station.

3. The communication system according to claim 1, wherein the first terminal, in operation, transmits to the communication node, signaling to inform the switching of the radio connection destination, in response to receiving the signaling, the communication node determines that the data transmission from the first terminal is stopped, and in response to the switching of the radio connection destination being completed, the communication node determines that the data transmission from the first terminal is resumed.

4. The communication system according to claim 1, wherein, when switching the radio connection destination from the base station to the relay terminal during use of the first service, the first terminal establishes a connection with the relay terminal, and receives, from the relay terminal, information for generating an internet protocol (IP) address to be used by the first terminal for the second service.

5. The communication system according to claim 4, wherein the first terminal establishes the connection with the relay terminal and receives the information for generating the IP address subsequent to initiation of the buffering of the data.

6. The communication system according to claim 4, wherein the first terminal establishes the connection with the relay terminal and receives the information for generating the IP address prior to initiation of the buffering of the data.

7. The communication system according to claim 6, wherein the first terminal, subsequent to establishing the connection with the relay terminal, determines whether or not a signal received from the base station is less than a threshold, and in response to the signal received from the base station being less than the threshold, the first terminal receives the information for generating the IP address.

8. The communication system according to claim 6, wherein, in response to receiving the pause request, the communication node extends the size of a receiving buffer or a transmitting buffer.

9. A terminal comprising:

circuitry, which, in operation, transmits data to a communication node by using either of a first service performing communication with the communication node via a base station, or a second service performing communication with the communication node via a relay terminal; and a storage, which, in operation, buffers data, wherein the circuitry, in operation, transmits a pause request to the communication node to pause data transmission from the communication node to another terminal, and buffers, subsequent to the pause request being transmitted, data generated during switching of the radio connection destination when a floor is obtained from the communication node, and when switching the radio connection destination from the base station to the relay terminal during use of the first service or from the relay terminal to the base station during use of the second service, and the circuitry, in operation, transmits the buffered data to the communication node after completion of the switching of the radio connection destination.

10. The terminal according to claim 9, wherein when using the first service, the circuitry, in operation, determines to switch the radio connection destination by starting detection of the relay terminal, and when using the second service, the circuitry, in operation, determines to switch the radio connection destination by detecting a signal from the base station.

11. The terminal according to claim 9, wherein the circuitry, in operation, transmits to the communication node, signaling to inform the switching of the radio connection destination.

12. A communication control method in a communication system including a first terminal with that has a floor granted and transmits data to a communication node, and a second terminal that receives the data from the communication node, comprising:

in the first terminal, using either of a first service performing communication with the communication node via a base station, or a second service performing communication with the communication node via a relay terminal;

in the first terminal, when the first terminal switches a radio connection destination from the base station to the relay terminal during use of the first service or from the relay terminal to the base station during use of the second service, transmitting a pause request to the communication node to pause data transmission from the communication node to the second terminal, and buffering, subsequent to the pause request being transmitted, the data generated during the switching of the radio connection destination; and transmitting the buffered data to the communication node after completion of the switching of the radio connection destination.

* * * * *